United States Patent [19]
Pirc

[11] Patent Number: 5,925,958
[45] Date of Patent: Jul. 20, 1999

[54] DC MOTOR UTILIZING PERMANENT MAGNETS

[76] Inventor: Anton Pirc, P.O. Box 7487, Santa Rosa, Calif. 95407

[21] Appl. No.: 08/880,048

[22] Filed: Jun. 20, 1997

Related U.S. Application Data

[60] Provisional application No. 60/020,164, Jun. 20, 1996.

[51] Int. Cl.$^6$ ........................................... H02K 1/00
[52] U.S. Cl. .............................. 310/152; 310/46; 310/48; 310/112; 310/114; 310/153
[58] Field of Search .................... 310/40 R, 46, 310/48, 67 R, 112, 114, 152, 153, 157

[56] References Cited

U.S. PATENT DOCUMENTS

| | | | |
|---|---|---|---|
| 3,895,245 | 7/1975 | Bode | 310/46 |
| 3,899,703 | 8/1975 | Kinnison | 310/103 |
| 4,151,431 | 4/1979 | Johnson | 310/12 |
| 4,456,858 | 6/1984 | Loven | 310/156 |
| 5,192,899 | 3/1993 | Simpson et al. | 318/139 |
| 5,304,881 | 4/1994 | Flynn et al. | 310/156 |
| 5,455,474 | 10/1995 | Flynn | 310/181 |

*Primary Examiner*—Nestor Ramirez
*Assistant Examiner*—Burton Mullins
*Attorney, Agent, or Firm*—Blakely Sokoloff Taylor & Zafman, LLP

[57] ABSTRACT

A motor produces a rotary motion by synchronizing the attractive and repulsive magnetic interactions of magnetic fields. A stator magnetically interacts with a rotor, cycling through changes in magnetic phase. A minimum of energy is required to spin the stator between modes. During a freewheeling state, the stator spins about its own axis while a rotor passes by. A second stator interacts with a magnetic field to create an equal and opposite magnetic force sufficient to rotate the stator. A rotor is mounted about a central axis and has a pair of diametrically opposing arcuate magnetic channels located substantially near the periphery of the rotor. A magnetic field extends substantially across each channel in which the polarities of the channels are equal and opposite extending radially outward or inward with respect to the central axis. When the rotor channel passes through a stator central axis of rotation, the rotor and stator are in magnetic proximity to one another. The rotor revolves around the stator so that its channel envelopes and swings past the stator. The rotor's channel approaches the stator in a magnetically attracting mode. When the stator is initially enveloped in the channel, the stator spins on its axis and continues spinning in a "freewheeling mode" until approximately half the channel's sector has traveled past the spinning stator. The stator stops spinning so that its polarity with respect to the rotor's channel is in a magnetically repelling mode. Through the synchronization of magnetically attracting and repelling modes, magnetic force is efficiently transferred into mechanical force.

2 Claims, 9 Drawing Sheets

DC MOTOR UTILIZING PERMANENT MAGNETS

CROSS REFERENCE TO RELATED APPLICATIONS

This application claims the benefit of U.S. Provisional application Ser. No. 60/020,164, filed Jun. 20, 1996.

STATEMENT REGARDING FEDERALLY SPONSORED RESEARCH OR DEVELOPMENT

Not Applicable.

BACKGROUND OF THE INVENTION

1. Field of the Invention

The present invention relates to a new and useful means and methods for providing power, including rotational power, and more specifically, a means for converting magnetic energy to mechanical or rotational energy or force.

More particular, the present invention relates to the field of magnetism, a motor comprising magnetic means and methods of efficiently converting mechanical energy from magnetic energy. Further, the present invention more particularly relates to a Direct Current (DC) motor utilizing permanent magnets and to methods of making and operating the same.

In a further aspect, the present invention relates to configuring the interactions of magnetic elements so as to utilize the energy stored in magnetic fields to efficiently provide mechanical force. More particularly still, the present invention concerns a DC motor which utilizes permanent magnets and permanent magnetic fields to provide mechanical force.

2. Description of the Related Art

It is well known that a magnetic force causes attraction and repulsion between magnetic elements. Permanent magnetism is but one application of magnetism.

Prior art electric motors have relied on magnetic interactions to generate motive force, which can be easily verified by considering the fact that the typical automobile has employed three different kinds of such motors. An electric starter uses the direct current from a battery to produce mechanical force. The original automotive generators have been replaced with alternators which use magnetic interactions and mechanical rotary force to generate electricity.

It is well recognized by the prior art that the energy stored within a permanent magnet can be used to produce useful work. More specifically, it has been established that the energy within a permanent magnet, or a plurality of permanent magnets, can be harnessed to provide rotational force.

Prior art motors may be characterized according to physical and electrical properties. Some motors rely completely on permanent magnet elements, or a combination of magnetic elements such as a permanent magnet rotor and an AC/DC powered coil, for example. Motors may rely on the repelling force of magnetism, the attracting force of magnetism, or a combination of both, whether the motor uses permanent magnetic fields, alternating magnetic fields or a combination thereof to any extent. In any case, such motors are inefficient, as explained below.

Rotary machines powered by the mutual interaction of permanent magnetic members producing a magnetic field are generally known apparatus employing such interactions between a stator and a rotor have found application, for example, in brushless DC motors, pulse motors, and electric stepping motors.

One of the major problems for any motor utilizing magnetism to provide mechanical force can be generally referred to as "cogging". Cogging reduces overall motor efficiency and is caused, in part, when a magnetic force hinders the motion of the rotor or armature movement.

For motors which use electromagnets, coils, or the like, to generate a permanent magnetic field, cogging can be reduced or eliminated by pulsing electricity to the coil on and off under appropriate timing. Thus, the permanent magnetic field is switched off before it can hinder rotor motion. However, coils and electromagnets consume energy and also induce a substantial amount of induced back electromotive force (EMF). The prior art discloses powering the coil with a constant DC and AC source to avoid the back EMF from switching a DC source. However, once again, there is considerable power consumption lost to the coil.

U.S. Pat. No. 4,456,858 (Loven) discloses an AC/DC motor consisting of permanent magnet members each having an eccentric or nonsymmetrical geometric configuration, and with magnetic field polarities arranged so that repelling magnetic fields from adjoining members cause a limited rotation of one of the magnetic members. Rotation continues until a point of magnetic equilibrium is reached at which point a rotational assist is received from an electromagnet and permanent magnet in combination. A photosensitive device triggers the electromagnet at the point of static equilibrium which in turn causes its associated permanent magnet to rotate, thereby generating a pulse of rotational force which overcomes the magnetic equilibrium.

U.S. Pat. No. 5,192,899 (Simpson et al.) discloses an electromagnetically powered rotary motor in which an electromagnet arrangement is pulsed on and off to repel a plurality of permanent magnet members affixed to a pair of rotary wheels. It is essential with that design that the electromagnet be turned off at key point in the cycle, prior to repelling, so that rotation is not impeded by the repelling force. Simpson et al. discloses an electromagnet powered by both an AC and DC power source (to avoid the inductive back EMF produced by a DC coil). With any magnetic motor using an electromagnet, the energy required to power the electromagnet substantially reduces overall efficiency of the motor.

The prior art devices are based upon certain valid data and assumptions. Briefly, it is recognized by the prior art that permanent magnets can be employed with a rotor and with a cooperating stator to provide a magnetic motor. A substantial quantity of energy resides within a permanent magnet and even though substantial loading is placed upon the magnet, the energy dissipates slowly over an extended period of time. Further, the prior art recognizes that the input of electrical energy into a magnetic motor is intermittent and for short intervals. Accordingly, it is possible to control substantial amounts of output power with relatively small amounts of input electrical energy.

The potential indicated by the foregoing data, however, has never been fully realized by the prior art. For example, a magnetic motor may operate only by repulsion. However, energy can be extracted from a magnet both in repulsion and attraction. Therefore, it is seen that only one-half of the energy available within the permanent magnets is being utilized. Further, the energy is utilized during exceedingly short, widely spaced, impulses. The use of two solenoids to operate a single rotor is considered excessive energy.

Another prior art device operates totally upon the energy available at one pole of the rotor magnets and ignores the energy available at the other end thereof. The magnetic shield usurps a portion of the energy from the rotor magnets, which energy is not available to do useful work in the form of urging rotation of the rotor. Further, at a specific point in the area of the apex of the shield, each magnet is concurrently influenced by the shield and the opposing magnet. At this point, which is prior to the point of tangency, an equilibrium is reached tending to bring the rotor to a stop. From that point to the point of tangency, the opposed magnets are in repulsion, the net result of which is a force in a direction counter to the normal direction of rotation. The primary purpose of the stator magnet is to pull the opposed rotor magnets from the point of equilibrium through the point of tangency. It is seen therefore that the motor operates entirely upon the repelling force of the permanent magnet and the energy of the stator magnet does not materially add to the power of the motor.

BRIEF SUMMARY OF THE INVENTION

The present invention involves the movement of a moveable magnetic member, defining a rotor, relative to a fixed magnetic member, defining a stator, the movement being powered by magnetic interactions between the moveable and fixed magnetic members so as to provide mechanical force including rotary and linear motion. The movable magnetic member, defining the rotor, has at least one magnetic channel with a magnetic field normal to the locus of movement. The moveable magnetic member moves in a locus, which includes the fixed magnetic member, defining the stator. The magnetic field of the stator magnetically attracts or couples with the magnetic field in the channel of the rotor so as to cause the relative movement of the rotor. When the stator is substantially within the channel, the magnetic fields of the rotor and stator are fully coupled. At this point, the stator spins on a central axis in a freewheeling mode while the rotor continues its relative movement thereby. When the rotor reaches a relative position where the stator is near the opposite end of the channel, the stator is held net 180° out of its original position so that its magnetic field now repels the magnetic field within the channel thereby imparting repelling magnetic force on the rotor.

The present invention also teaches a magnetic motor for producing mechanical force including rotary force, comprising a generally circularly symmetric rotor having an even number of radially opposing magnetic sectors, each sector being divided by an arcuate channel having a radially aligned magnetic field, each radially aligned magnetic field alternating in polarity from sector to sector; at least one generally cylindrically shaped stator having a constant bipolar magnetic field, the north pole of which is located along the length of one cylindrical wall of the stator and the south pole of which is located 180° diametrically opposed on the opposite wall of the stator; and a stator spinning means; the stator being rotatably suspended from the spinning stator means. As known in the art, a suitable power take-off means can be attached to the rotor shaft, e.g., a DC motor.

A method of operating a magnetic rotor having a magnetic channel, and a magnetic stator, the method employing a transitional freewheeling mode to increase efficiency of a motor as the stator switches from a magnetically attracting phase to a magnetically repelling phase; the freewheeling mode being intermediate to said magnetic phases whereby magnetic inefficiencies such as cogging are substantially reduced or eliminated. The method is applicable to any magnetic members involving reciprocating motion including reciprocating linear motion.

The problems of the prior art are further reduced by feedback of rotational energy to the stator spinning means during freewheeling mode.

In one embodiment, all of the magnetic elements, e.g., rotor, stator and stator spinning means, are each comprised of permanent magnet members. A flywheel further assists the stator spinning means in spinning the stator.

This invention involves the movement of a rotatable magnetic member relative to a fixed magnetic member so as to produce mechanical force including rotary or linearly directed force. A magnetic rotor having at least one channel, said channel having a magnetic field running across thereto, rotates in a locus including a fixed magnetic stator. As the rotor channel approaches the stator, the stator produces a magnetic field which attracts the magnetic field in the rotor's channel. When the stator is engulfed into the channel plus a small increment, the stator spins in a freewheeling mode until the rotor has moved into a position where the stator is just prior to being expelled from the channel, plus an increment. At this point, the stator is rotated and held 180° out of its position so that its magnetic field now repels the magnetic field of the channel, thereby imparting a push to the rotor as the rotor passes by the stator.

The present invention comprises means for arranging magnetic interactions so as to convert magnetic force into mechanical or rotary force, said means comprising: one or more stators each capable of producing a magnetic field and having generally north and south magnetic poles respectively, each of said stators being adapted to spin around a shared central axis; a magnetic rotor comprising one or more x-configured sections, each of said x-configured sections having a central axis defining a first and second sector on opposite ends, each of said sectors further including an arcuate bank of magnetic elements separated by an interior arcuate channel, each of said arcuate channels having a magnetic polarity;

wherein said outer and inner arcuate banks of magnetic elements of said first sector are arranged so that a magnetic field emanates from said outer bank and terminates on said inner bank of magnetic elements and said outer and inner arcuate banks of magnetic elements of said second sector are arranged so that a magnetic field emanates from said inner bank and terminates on said outer bank of magnetic elements;

said rotor being adapted to rotate on a central axis so that said first and second sectors orbit said stator through said channel of said sector 180° out of phase;

means for spinning said stator is in a freewheeling mode, said stator entering a freewheeling mode after being maintained in a stationary and attractive mode with respect to said first sector until said stator is initially enveloped approximately within said channel of said sector; and means of receiving energy from an external power source for starting said dynamic system in a transient phase.

The substantially circularly symmetric rotor has an even number of arcuate channel segments, said arcuate channel segments defining a central circular locus therebetween, said arcuate channel segments each having a magnetic field normal to said locus, said channel segments alternating in magnetic polarity with respect to each channel.

It is an object of the present invention, therefore, to provide an improved magnetic motor without the deficiencies characteristic of prior art magnetic motors.

Accordingly, it is an object of the present invention to provide an improved permanent magnet motor.

Another object of the present invention is to provide a magnetic motor having a rotor and at least one stator, each of which is adapted to produce a bipolar magnetic field.

Accordingly, another object of the present invention is to provide a magnetic motor having a rotor and at least one stator, each of which is comprised of permanent magnets.

Still another object of the present invention is to provide a permanent magnet motor wherein the energy of each pole of each magnet is utilized to produce mechanical force including rotation.

It is another object of the present invention to provide a magnetic motor wherein the energy of magnetic attraction and magnetic repulsion are utilized to produce mechanical force including rotational force.

And, accordingly, it is still another object of the present invention to provide a permanent magnet motor wherein the energy of each pole of each magnet is utilized to produce rotation of the rotor.

It is another object of the present invention to provide an operating cycle for a magnetic motor which includes alternating magnetic phases of attraction and repulsion.

It is an advantageous feature of the present invention to provide an operating cycle for a magnetic motor which utilizes an intermediate freewheeling phase to separate magnetic attraction from the magnetic repulsion.

Accordingly, it is an object of the present invention to provide an operating cycle for a magnetic motor in which the sequence of magnetic attraction and repulsion phases are separate and distinct.

It is another object of the present invention to arrange the magnetic interactions between magnetic elements so that for every independent attraction/coupling there is a repulsion/decoupling in the same operating cycle.

Accordingly, it is another object of the present invention to provide an operating cycle for a magnetic motor in which the transition in phases from magnetic attraction to magnetic repulsion is accomplished with minimal input energy.

Accordingly, it is another object of the present invention to provide an operating cycle for a magnetic motor in which the transition in phases from magnetic attraction to magnetic repulsion is accomplished with minimal magnetic loss, i.e., minimal cogging.

It is another object of the present invention to provide a magnetic motor having a highly favorable ratio of input energy to output power.

It is another object of the present invention to provide a magnetic motor having improved efficiency of operation.

It is another object of the present invention to provide a magnetic motor that is able to provide a relatively high torque.

It is another object of the present invention to provide a magnetic motor that is environmentally nonpolluting and environmentally friendly.

It is another object of the present invention to produce a device that can be used to improve the distribution of energy.

It is another object of the present invention to exploit Coloumbs Inverse Square Law of Magnetism, by bringing permanent magnets of opposite polarity into close proximity of each other so that a repulsive force is generated.

It is another object of the present invention to provide a magnetic motor which is readily fabricated in a variety of sizes and configurations depending on its intended use.

It is another object of the present invention to provide a magnetic motor which is readily assembled and dissembled.

Accordingly, it is another object of the present invention to provide a magnetic motor which is comparatively simple and inexpensive to manufacture, yet is relatively durable and maintenance free.

It is another object of the present invention to provide a magnetic motor of the above type which can be efficiently and reliably operated in extreme temperatures.

It is another object of the present invention to provide a magnetic motor of the above type which can be efficiently and reliably operated underground.

It is another object of the present invention to arrange the magnetic interactions between magnetic elements so that the permanent magnetism does not degenerate appreciably.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

In accordance with the teachings of the present invention, magnetic motors are made with a novel configuration of magnetic elements and are efficiently operated with a novel method of operation. In particular, the present invention teaches a novel method of efficiently controlling the dynamic magnetic interactions between a moving magnetic member and a fixed magnetic member, using an intermediate freewheeling mode in the operating cycle, which method can be applied to other systems of magnetic elements for efficient output of power.

At the outset, the present invention will be described with respect to its broadest aspects with specific examples to follow. Although the present invention is applicable to a broad range of systems or arrangements of interacting magnetic elements, the specific examples which follow relate primarily to magnetic elements substantially comprising permanent magnet members.

Figure 1:
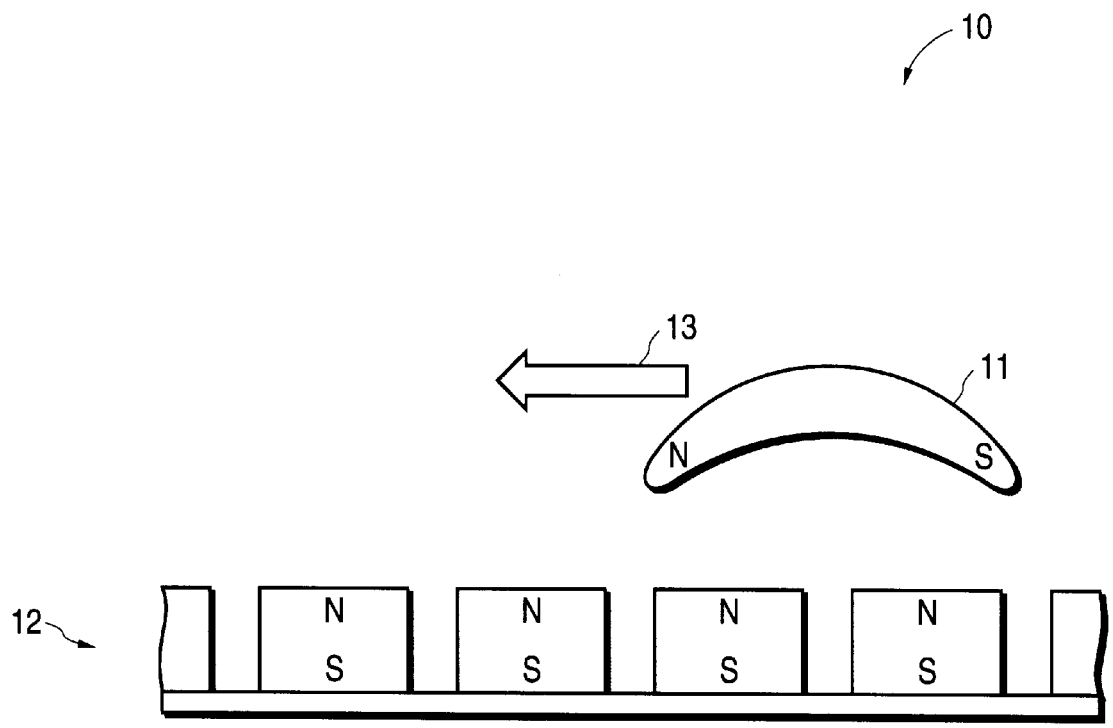
FIG. 1 is a diagram of the prior art.

FIG. 1 shows a linear embodiment of a permanent magnet motor 10 of the prior art which derives its motive power from both the magnetic interactions of attraction and repulsion between a fixed track (stator) 12 and moving armature (rotor) 11. For this illustrative prior art example, which is essentially FIG. 5 of U.S. Pat. No. 4,151,431, issued to H. Johnson, energy is lost through the inefficient application of magnetic forces. This is because the magnetic interactions of attraction and repulsion simultaneously act in opposition of armature magnet 11 to create a net motive force. As can be seen from FIG. 1, there are several magnetic forces interacting with the armature magnet which simultaneously both retard and promote linear motion. Presumably, the result of these opposing magnetic interactions is a net magnetomotive force on the armature in the direction 13 shown. However, the reduction in efficiency because of the energy lost through cancellation of opposing mangetomotive forces would be substantially reduced if, for example, all of the magnetic forces were applied in the direction of the armature movement.

Figure 2:
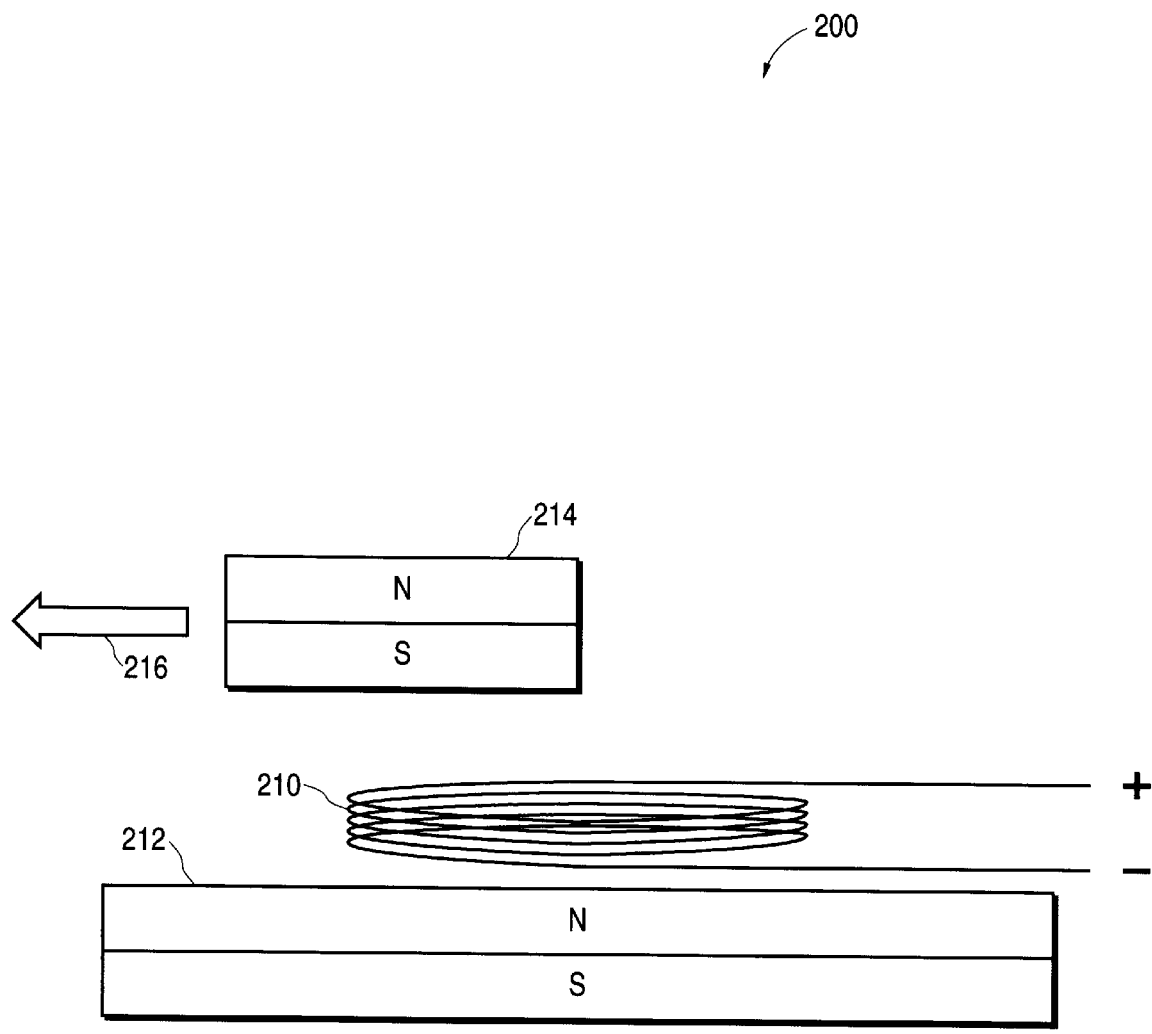
FIG. 2 is a diagram of the prior art.

FIG. 2 shows another typical way in which magnetic motors of the prior art incur substantial operating inefficiencies when magnetic elements, a permanent magnet stator 214, rotor 212, and an electrified coil 210, in combination, use the repelling magnetic field produced by the electrified coil to interrupt or decouple a magnetically attracting mode and thereby produce a net magnetomotive force in the direction 216 of rotor movement. FIG. 2, which is essentially FIG. 21 of U.S. Pat. No. 5,455,474, issued to C. Flynn, shows how opposing magnetomotive forces applied in diametrically opposed directions presumably result in a net motive force in the direction 216. The opposition of magnetic forces as well as the energy required to electrify the coil substantially reduce overall efficiency of the magnetic motor.

Magnetic inefficiencies can arise as a result of switching to and from any combination of magnetic attraction and repulsive phases, such as, switching from attraction to attraction, repulsion to attraction, attraction to repulsion, and, repulsion to repulsion. The term "cogging" generally refers to a tendency of a moving magnetic element to come to a point of static equilibrium as a result of magnet efficiencies caused from opposing magnetomotive forces. These problems are encountered regardless of the configuration of the prior art device, such as for example, whether coaxially aligned magnetic elements (Flynn) or magnetic elements in a side-by-side relationship (Kinnison and Bode).

As previously discussed, many of the magnetic motors of the prior art have employed various shielding means in an attempt to separate opposing magnetomotive forces acting upon a magnetic member, such as a rotor or armature. However, typically these shielding means are substantially inefficient.

Figure 3:
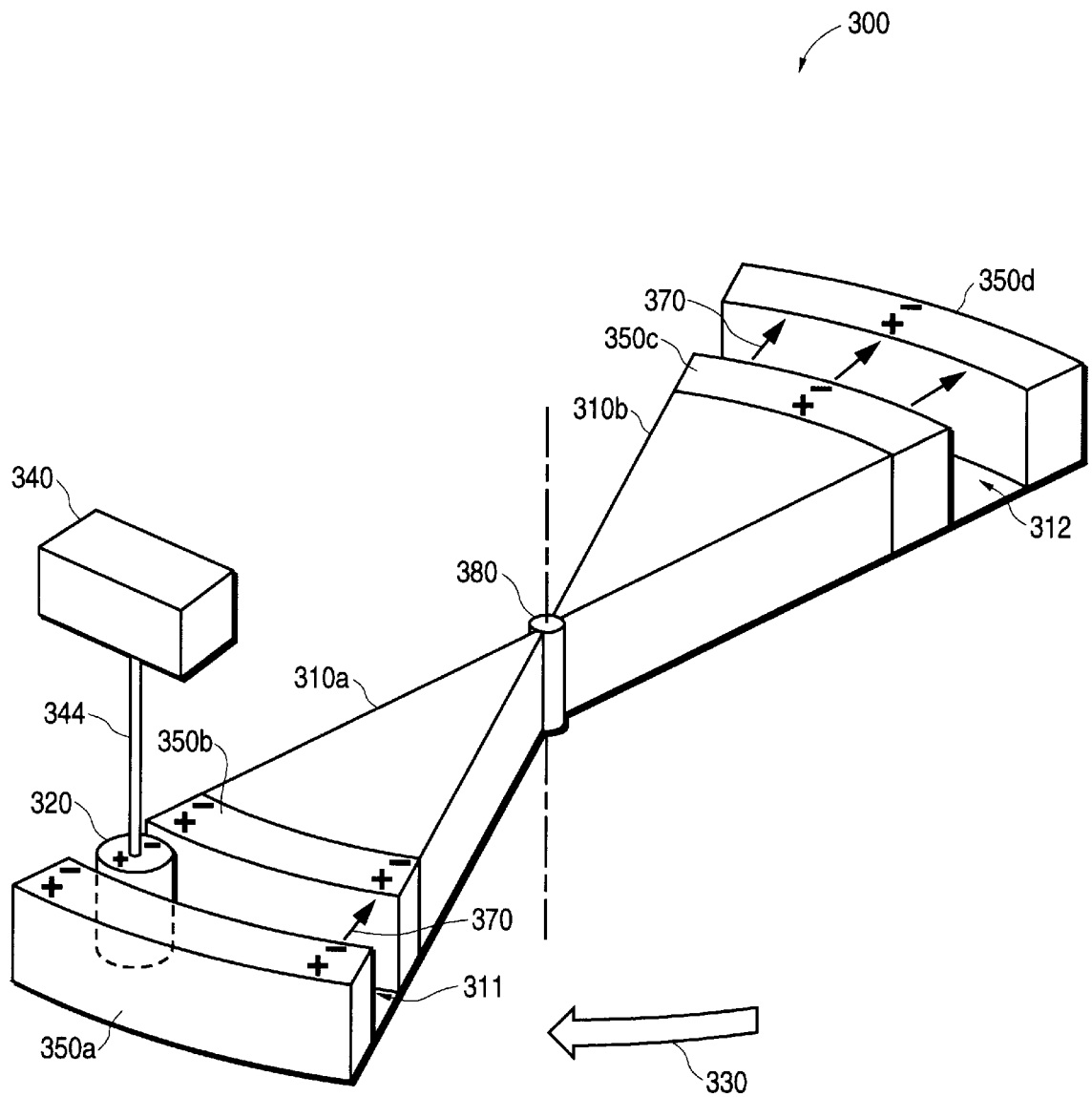
FIG. 3 is a partial diagram of an embodiment of the present invention.

In an embodiment 300 of the present invention as shown in FIG. 3, motive force is derived from the magnetic interactions between two diametrically opposed magnetic channels 311 and 312 defining a rotor 310 in cooperation with a relatively fixed magnetic element defining a stator 320. (The "+" and "−" signs generally indicate the direction of a magnetic field.) The magnetic interactions of attraction and repulsion between the rotor 310 and stator 320 occur in separate and distinct phases so that the magnetomotive forces generated from each phase are in the direction of and benefit rotor rotation 330. Thus, energy loss from the superposition of opposing magnetic forces is eliminated.

In one preferred operating cycle for the permanent magnet embodiment corresponding to FIGS. 4–8, the magnetic interactions of attraction and repulsion are separated by an intermediate freewheeling phase, or mode, of operation. During this freewheeling phase, the stator 320 spins on its own central axis to efficiently switch from magnetic attraction to magnetic repulsion with minimal energy loss. Thus, the operating inefficiencies created by opposing magnetomotive forces as well as the operating inefficiencies incurred by switching magnetic phases from attraction directly to repulsion are substantially reduced or eliminated.

In all of the operating cycles for the present invention herein described, the magnetic interactions of attraction and repulsion occur in two separate and distinct phases, or modes, of operation. The first phase of an operating cycle comprises the magnetic force of attraction between the magnetic rotor and magnetic stator. The magnetic force of attraction effects the relative movement of the rotor towards the fixed stator. In a third magnetic phase, the magnetic force of repulsion is used to effect continued rotation of the rotor past the stator.

Preferably, the operating cycle for the present invention comprises three phases or modes. Through a novel operating cycle, the initial magnetically attractive phase is separated from the final magnetically repulsive phase by an intermediate freewheeling phase. One purpose of this freewheeling phase, or mode, is to substantially reduce or eliminate the magnetic inefficiencies and energy losses caused by switching directly from magnetic attraction to magnetic repulsion, thereby improving overall motor efficiency.

In one embodiment, operating efficiency is further enhanced by the internal feedback of magnetic and rotational forces beginning with the freewheeling phase and ending after the repulsion phase. The internal feedback of magnetic rotational force is transmitted through what is termed a neutral shaft, the operation and concept of which is described in detail below.

With further reference to FIG. 3, the present invention is a magnetic motor 300 essentially comprising a magnetic stator 320, a magnetic rotor 310 and a stator spinning means 340, in combination.

The stator 320 is a magnetic element encased in a substantially cylindrically shaped housing, which element produces a magnetic field that in free space emanates from one concave surface and terminates on its diametrically opposed surface thereby defining a general north and south pole as indicated. (For purposes of illustration, "+" represents a north magnetic pole and "−" represents a south magnetic pole.) Stator 320 is rotatably coupled to the stator spinning means 340 through rotatable shaft 344. The stator spinning means is any means which can rotate a shaft and is generally represented by the "black box" 340 in FIGS. 3–4. It is understood that the stator spinning means may have an external power source, such as an electric motor (not shown). It will be understood by those skilled in the art that the stator housing may be of other geometric configurations including substantially rectangular, for example. What is essential is the configuration of the resulting magnetic field. FIG. 3 schematically shows how the stator 320 may be any magnetic element that produces a diametrically opposed magnetic field as shown, and which element is capable of interacting with the magnetic field produced by the rotor 310. Although not shown in the permanent magnet embodiment of FIGS. 3–4, preferably, the magnetic element for the stator 320 is comprised of the same kind, albeit a lesser amount, of permanent magnet members 351 used to construct the magnetic segments 350a–350d.

The rotor 310 comprises a pair of diametrically opposed, interconnected, arcuate magnetic channels 311 and 312, respectively, each channel having a substantially radially aligned magnetic field 370 directed across therein, and each channel having an outer concave arcuate wall and an inner concentric convex wall wherein said magnetic field is substantially normal to said walls.

The rotor 310 rotates on a central shaft 380 and is supported by a plurality of stainless steel nonmagnetic bearings (not shown). As will be described, the rotation of the rotor 310 is powered by the magnetic interactions with the stator 320.

As known in the art, a suitable power take-off means may be attached to the shaft of the rotor (not shown). For purposes of illustrating a basic operating cycle of the present invention, the details of the associated supporting structures, such as the nonmagnetic stainless steel beams and other supportive members, are not shown and form no part of the present invention.

In this illustrative embodiment and with further reference to FIG. 3, a generally circularly symmetric x-configured rotor 310 comprises two diametrically opposed magnetic sectors 310a and 310b. Each sector 310a and 310b has a pair of spaced apart concentric arcuate segments 350a–350d, respectively, thereby defining a pair of concentric arcuate channels 311 and 312, respectively.

It will be noted that arcuate segments 350a–350d schematically represent any magnetic elements known in the art capable of producing a radially aligned magnetic field across an arcuate gap. Preferably, permanent magnet members are used to make segments 350a–350d, thereby creating two diametrically opposed arcuate magnetic channels 311 and 312, respectively. When permanent magnet members 351 are used, the schematic arcuate segments 350a–350d accurately reflect the geometry needed to create such a radially magnetic field.

However, other suitable magnetic elements may be used to make the radially aligned channel in which the segments may not be limited to an arcuate shape. Notwithstanding the kind of magnetic element employed, different embodiments may employ one segment per sector.

An important aspect of this invention is the radially directed fields of each sector being oppositely aligned, with one radial field directed towards the center of the rotor, and the other directed radially outward away from the center. For purposes of illustration, the field lines 370 across channel 311 are directed radially inward, whereas the field lines 370 for channel 312 are shown directed radially outward in FIGS. 3–4. Thus, sectors 310a and 310b are geometrically symmetrical, but produce a radially aligned magnetic field in the opposite direction across their respective channels. The rotation of the channels defines a central circular locus 330.

Figure 4:
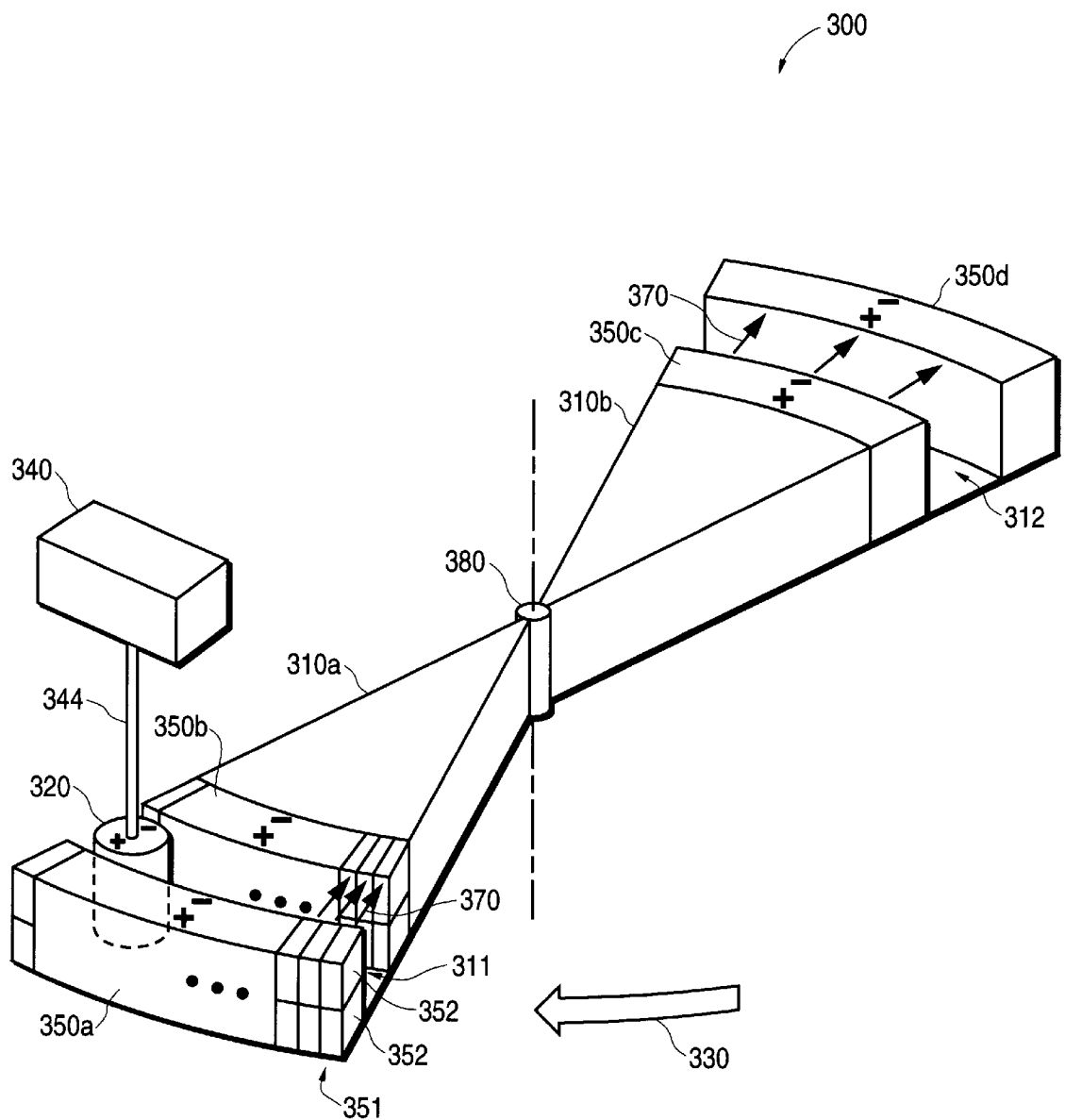
FIG. 4 is a diagram illustrating a preferred embodiment of the rotor of the present invention.

FIG. 4 shows how each rotor channel 311 and 312 has a plurality of radially aligned magnetic field lines normal to the inner convex walls defining 350b and 350c, respectively, as shown. The magnetic polarity is opposite for each channel. This is illustrated by the arrows 370 being in opposite directions. For the basic permanent magnet embodiment of the present invention shown in FIG. 4, the radial alignment of permanent magnet groups and opposing segment polarities create permanent magnet segments 350a–350d further having opposite dipolar magnetic polarity across their respective segments as shown. Rotor segments 350a–350d are comprised of a plurality of rectangular permanent magnet groups 352, each group being radially aligned and concentrically arranged as shown. (Arrows 370 extending from the positive and negative poles indicate the magnetic polarity across the channel. For purposes of clarity, arrows indicating the fringe magnetic fields are not shown.)

It will be understood by those skilled in the art that the magnetic sectors 310a and 310b schematically present any magnetic element capable of producing a radially aligned magnetic field across a gap, which in this embodiment defines an arcuate magnetic channel, and that the magnetic element is also capable of magnetically interacting with, i.e., magnetically attracting and repulsing, another magnetic element such as a stator. As such, segments 350a–b and 350c–d schematically represent the polarities of the magnetic field lines emanating from a source and terminating from a sink. As known in the art, magnetic fields are schematically represented by magnetic field lines as shown throughout the drawing and the prior art. In general, "+" signs are used to represent a source of magnetism in place of a north pole (N) whereas "–" signs are used to represent of a sink in place of a south pole (S). For permanent magnet members, the "+" sign is equivalent to a north pole, whereas the "–" sign is equivalent to a south pole. For other pole producing magnetic elements, such as salient pole producing magnetic members, the above signs have a similar meaning.

The stator 320 is centrally suspended in the circular locus 330 defined by the rotation of the midpoint of either arcuate channel 311 and 312, respectively. Although shown as a cylindrical element in FIGS. 3–4, the stator can be of a variety of configurations including substantially rectangular in shape. It is essential that the stator be capable of producing a polar magnetic field which alternately attracts and repels the magnetic field within the rotor channels.

OPERATION OF THE PREFERRED EMBODIMENT OF THE PRESENT INVENTION

The following method of operation assumes that the rotor and stator are permanent magnet elements.

Figure 5:
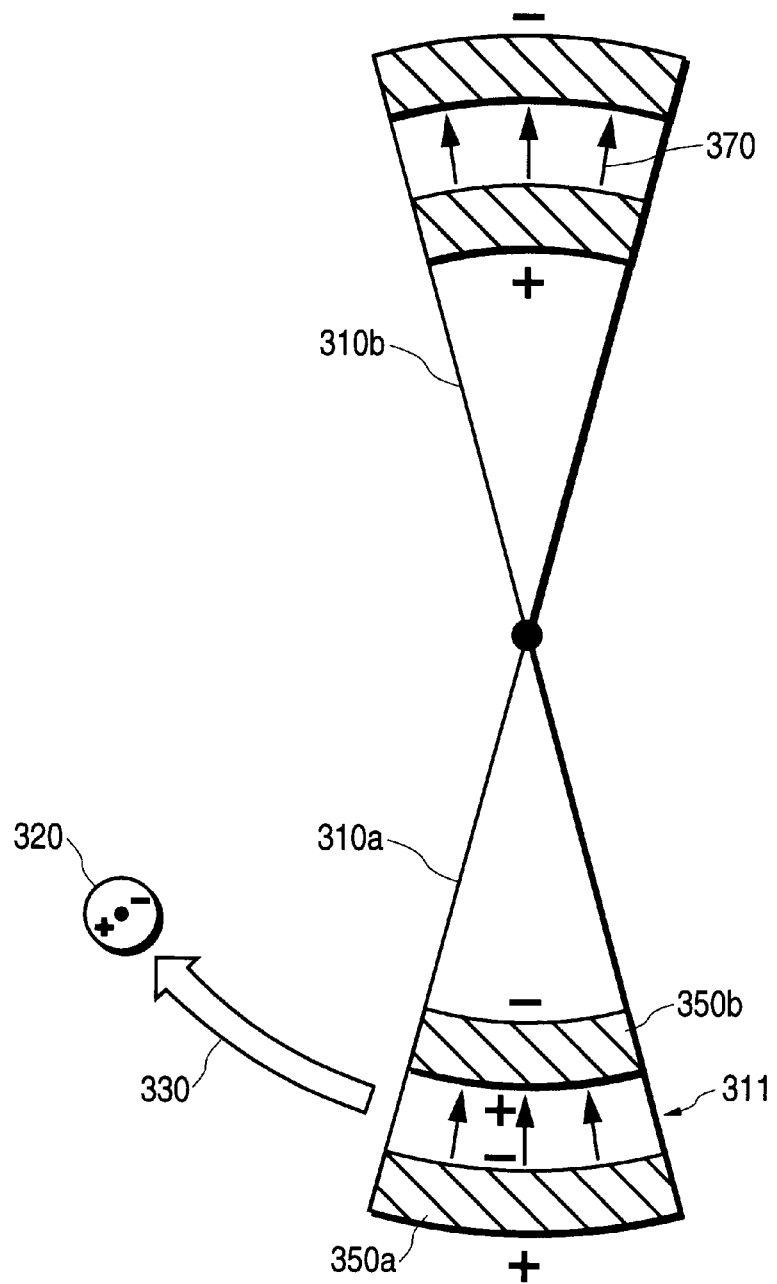
FIG. 5 is a top down view of an embodiment of the present invention.
Figure 6:
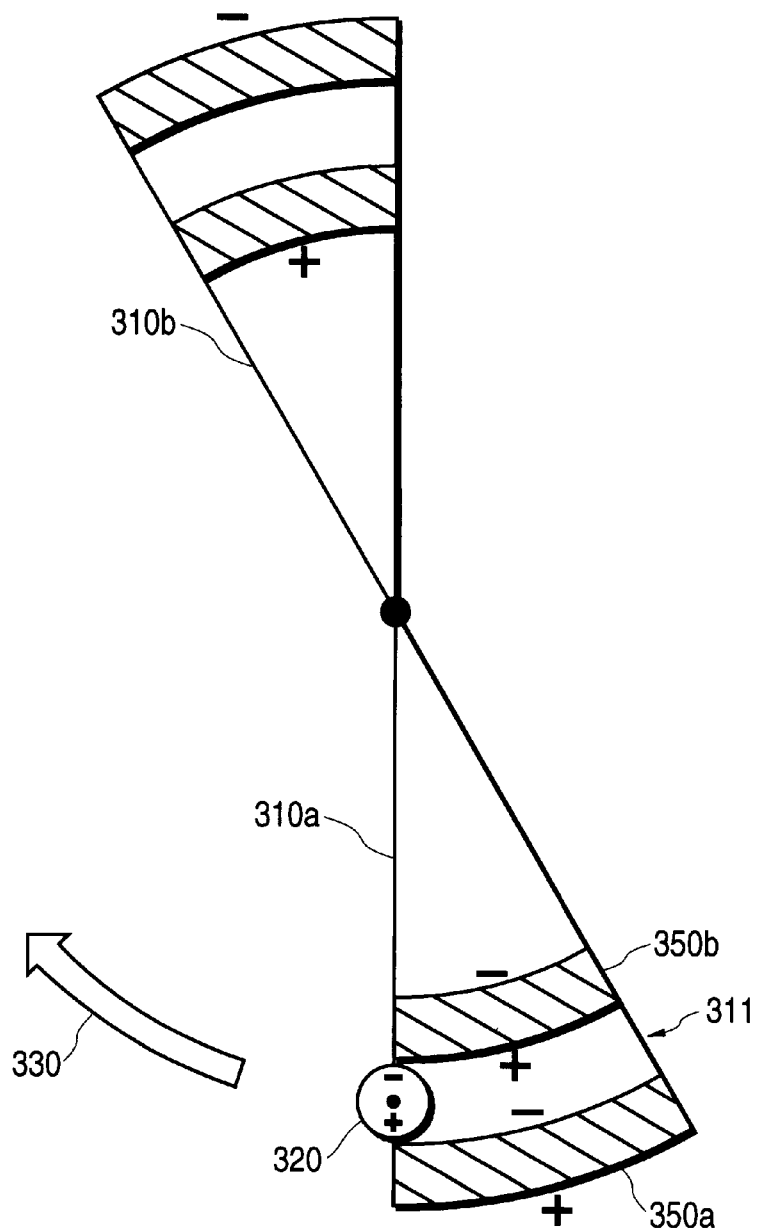
FIG. 6 is a top down view of an embodiment of the present invention.
Figure 7:
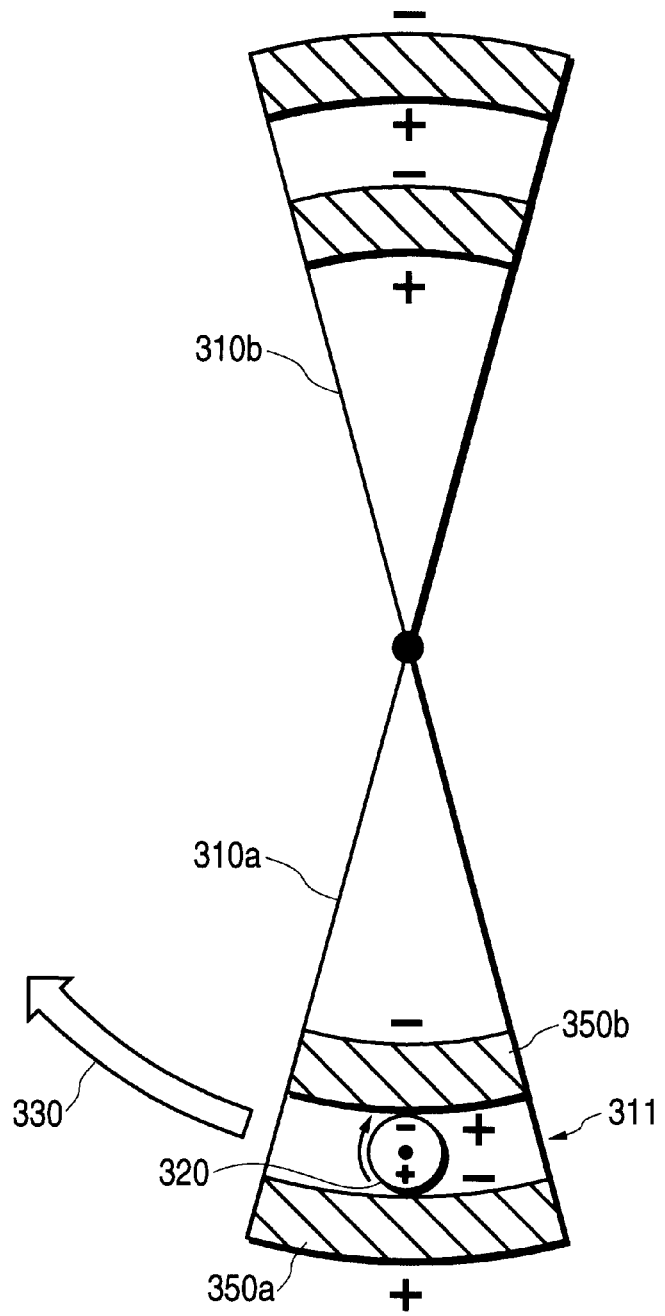
FIG. 7 is a diagram illustrating the beginning of a freewheeling phase of the present invention.

FIGS. 5–7 show the magnetic interactions of the rotor 310 and stator 320 during the steady state operation of the present invention. For ease of illustration, the direction of rotation of the rotor is taken to be in the clockwise direction 330 and the rotor channels are shown to be substantially linear. FIG. 5 shows how prior to the attraction phase, the stator 320 dwells in a stationary non-rotational state as the rotor segment 310a approaches the stator under its own moment of inertia/angular momentum.

The attraction phase begins when the rotor segment 310a is close enough to be pulled towards the stationary stator under the force of magnetic attraction supplied by the stator. The exact point when this force occurs depends on the kind of magnetic elements and magnetic materials involved.

FIG. 6 generally shows that when the stator 320 is substantially engulfed in the rotor channel 311, the rotor and stator continue to interact under the force of magnetic attraction. When the stator 320 is fully engulfed into the channel plus an additional amount of arc length, the force of magnetic attraction between the magnetic poles of the stator and the surrounding magnetic poles of the rotor channel 311 are substantially at a maximum. This is the endpoint of the magnetic attraction phase or mode. Thus, with respect to the stationary stator 320, the force of magnetic attraction has been used to pull the rotor channel towards the stator and around the stator 320.

FIG. 7 shows how the intermediate freewheeling phase begins after the stator 320 has been initially engulfed within the channel 311 plus an additional amount. The stator spinning means (not shown) engages the stator 320 to spin it about its cylindrical axis as the rotor 310 continues its rotation thereby.

During the freewheeling phase, the stator 320 spins under the control of stator spinning means (not shown). The stator spins a number of full revolutions during freewheeling mode, as will be more fully explained below.

Figure 8:
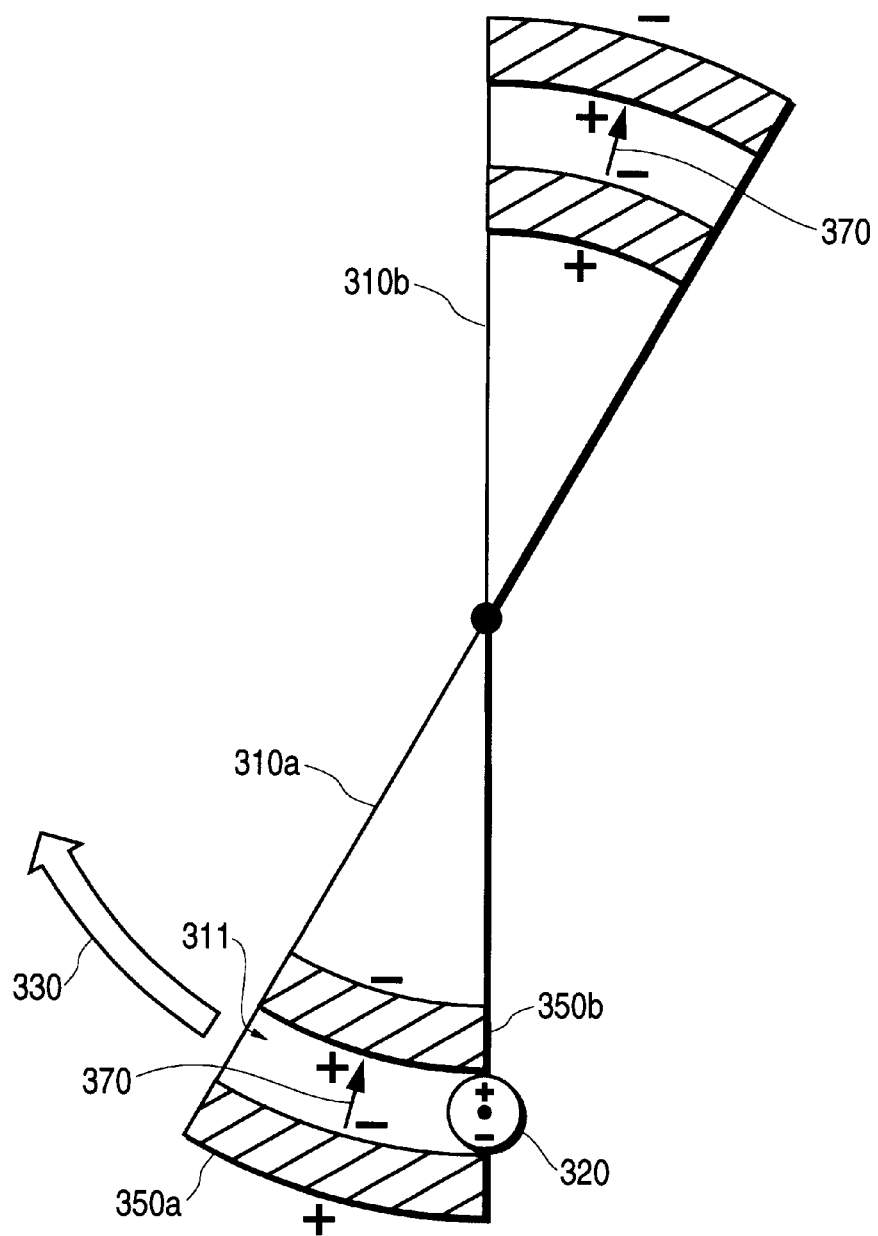
FIG. 8 is a diagram of the operation of the present invention as occurs when the bottom stator is in a repulsion phase.

FIG. 8 diagrammatically illustrates how after the stator 320 has spun in freewheeling mode until it substantially passes by the rotor channel 311, the stator reaches a point within the channel where the leading edge of the stator is about to exit the channel less a distance delta. This is relatively the mirror image of the point when freewheeling began following attraction mode and the arc length/distance prior to repulsion mode is substantially the same as the arc length/distance at maximal attraction. At the beginning of repulsion mode, the stator is engulfed plus an additional amount prior to the relative divulgation of the stator from the channel.

FIG. 8 shows how the spinning stator 320 is stopped in a magnetically repulsive mode so that the rotor 310 is pushed past the stator by the force of magnetic repulsion. Note how the "+" and "−" signs are aligned so that like poles are repelling each other. The stator has actually spun a number of full rotations plus an additional half rotation (n revolutions plus 180°) from its original position as illustrated in FIGS. 5–6.

It is noted in FIG. 8 that, after stopping the stator at n+180°, the polarity of the channel 312 will be in attraction mode with respect to the stator 320. This is because of the opposite direction of the radial magnetic field 370 across the channel 312 in comparison to the direction of the radial magnetic field 370 across channel 311.

Freewheeling mode eliminates the magnetic losses which would otherwise occur if the stator were allowed to remain stationary in attraction mode as the rotor continued its rotation thereby. Upon exit, attraction would retard movement of the rotor, i.e., cause cogging.

FIGS. 5–8 illustrate how a cycle of operation consists of a magnetic attraction mode, a freewheeling mode and a magnetic repulsion mode. The stator 320 spins only during freewheeling mode and remains stationary for the remainder of the power cycle until the second rotor segment 350b approaches. It is also apparent from FIGS. 5–8 that the stator is 180° out of phase with respect to its original polarity after freewheeling mode. However, the same cycle of operation applies with respect to rotor segment 350b because of the opposing polarity of channel 312. Thus, for the illustrated dual sector rotor 310 there are two cycles for each revolution. If the rotor has 4 sectors, there would be four cycles per revolution. The number of cycles could be doubled through the addition of a second stator and second stator spinning means 180° apart from the first rotator and stator spinning means. Further, the number of cycles could be doubled once again by having four stators and corresponding stator spinning means at 90° positions.

Although not indicated in FIGS. 5–8, the preferred embodiment of the present invention also uses what is described as a neutral shaft to minimize the energy required to maintain the stator, spinning smoothly and efficiently, during freewheeling mode and to use a form of feedback of rotational energy.

It will be understood by one skilled in the art that these concepts, which are presented in further detail with specific examples, can be applied to a wide range of coupled pairs of magnetic elements including stators, rotors, armatures, field coils and equivalent thereof.

In one embodiment of the present invention, all of the magnetic elements including the stator spinning means 340 are comprised of permanent magnets. For these permanent magnet embodiments, the stator spinning means 340 is more accurately termed a stator spinning assist means.

In other embodiments, it is possible to have the channels fixed and the cylindrical stator rotate on a radial arm or follow a track in the path of locus 330 as shown. It is possible to have a dual rotor embodiment in which the stator is between each rotor. In each of these alternative embodiments, the above-described operating cycle applies.

For embodiments not employing all permanent magnet elements, the magnetic field extending radially across the channel can be created by any magnetic field producing means known in the art, for example, electromagnets, bar magnets, horseshoe shaped bar magnets, field windings, armatures, coils and combinations and equivalents thereof. Although arcuate segmented magnets are illustrated herein, it will be appreciated that magnets of other shapes and sizes may be utilized without departing from the scope of the present invention. If horseshoe configured magnets are used, then the arcuate segments each represent a pole of the horseshoe. Any magnetic element or combination thereof is suitable for use in the arcuate segments so long as a radially aligned field defined by and running across the concentric inner circumferences defined by segments 350b and 350c, is created. Furthermore, the magnetic field is not limited to a DC field. The essence of the invention is that there be an initial attracting magnetic field to couple with the stator.

In the preferred embodiment of the present invention, the magnetic means is comprised of permanent magnet members. In particular, it is preferable that the permanent magnet members be comprised of a magnetic material having a high magnetic saturation coercivity, such as Neodymium Iron Boron. Less preferable are magnetic materials comprised of Samarium Cobalt and other ceramic type magnets. It is preferable that this field be substantially normal to the outer arcuate circumferences and therefore radially aligned. In a specific example described below, the arcuate segments having a radially aligned magnetic field are made entirely from rectangular bar magnets arranged in linear groups.

Specific Examples

The following specific and non-limiting examples describe the present invention in its most basic form. One of the examples, Example 1, represents an embodiment of a working prototype model. It will be easily understood by those skilled in the art that the specific examples presented below may be modified into more complex versions, such as versions having multiple rotors and stators, modularized combinations utilizing a number of permanent magnet motors mechanically coupled together, and motors herein described utilizing well known computer controlled, electronic and laser components in place of mechanical timing mechanisms.

EXAMPLE 1

Figure 9:
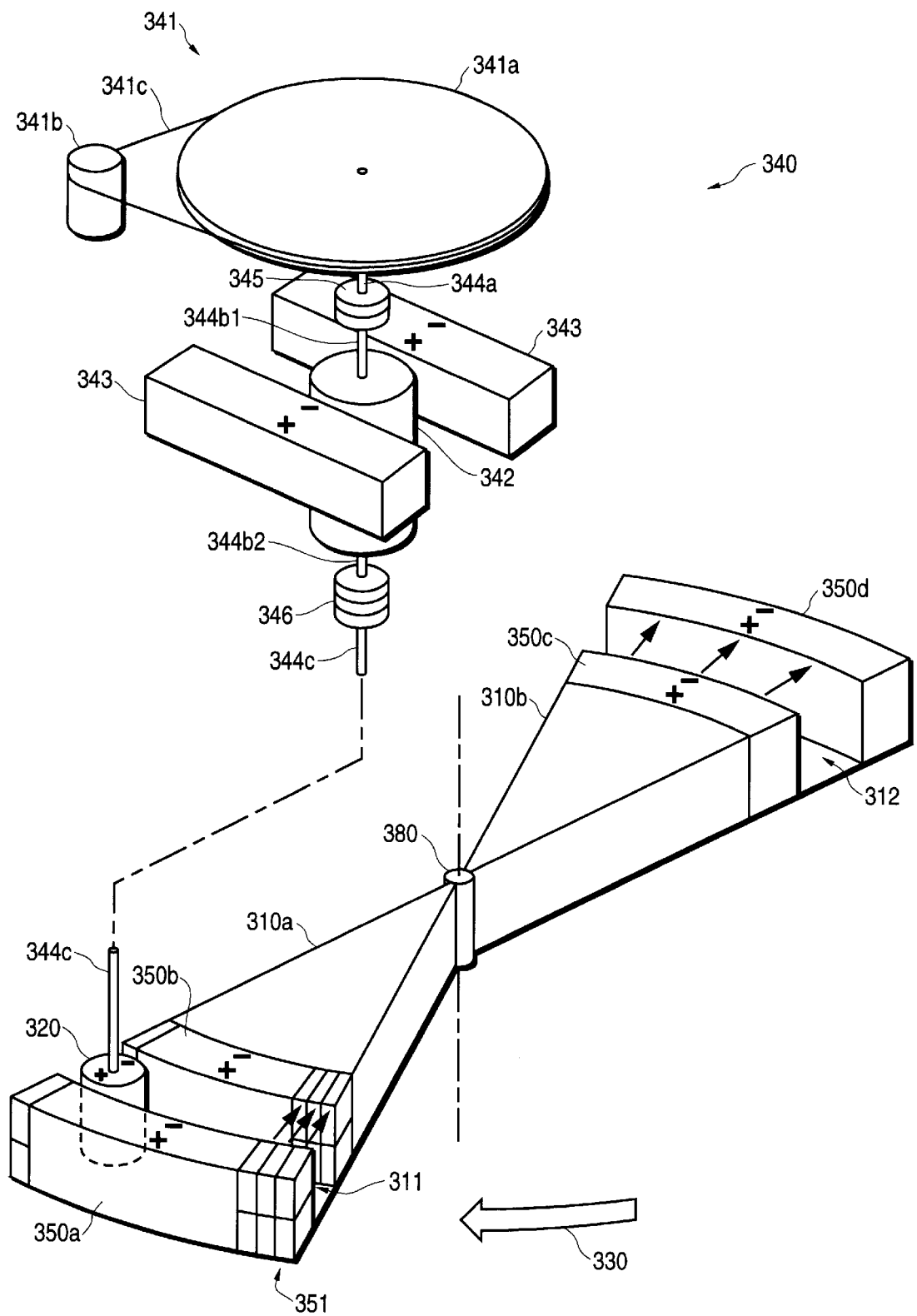
FIG. 9 is a diagram of a preferred embodiment of the present invention.

FIG. 9 diagrammatically illustrates how, for this specific example, the present invention comprises a rotor 310, a lower spinning stator 320, a means 340 for spinning the lower spinning stator 320, including flywheel assembly means 341, an upper stator 342 and a fixed dual linear magnet array 343, as shown. (The dual linear magnet array may be movable in another example.) The flywheel assembly includes a belt-driven flywheel powered by a suitable motor 341b, such as an electric motor.

It is important to note in FIG. 9, which shows an embodiment of the invention in the attraction mode described above and illustrated in FIG. 7, how the upper stator 342 is held in a magnetically repelling mode with respect to the stationary magnetic array 343. (Note how the like poles are adjacent in FIG. 9.)

FIG. 9 further shows how the spinning means 340 and lower stator 320 are detachably coupled through a three-piece rotatable shaft 344. The shaft 344 consists of three component shaft members 344a–344c. Shaft piece 344a is centrally suspended from the flywheel 341a and terminates in mechanical coupler-clutch assembly 345 and similar coupler-clutch assembly 346. Depending upon the point in the operating cycle, the shaft 344 may be assembled in any one of three configurations, as described below.

As presented in the introduction, the rotor 310 is mounted on a central bearing and is never in mechanical contact with the shaft or any other magnetic elements. The rotor 344 is free to rotate on its own axis and is powered from the magnetic interactions of the rotor with the lower spinning stator.

Suitable timing mechanisms, such as cam triggered levers and the like, synchronize and activate a plurality of mechanical couplers to engage various sections of the three piece rotatable shaft as will be described in further detail.

For the purpose of demonstrating the magnetic principles of this invention, the working model utilizes a network of cams, levers and cable-operated components to synchronize and activate the mechanical couplers which engage various sections of the three-piece rotatable shaft. It will be understood by those skilled in the art that electronic triggers, such as solenoid coils and other known suitable timing means, such as laser or Hall Effect devices, computer and microprocessor controllers, to name but a few, may be substituted in place of the mechanical timing system herein described.

All of the following examples herein described employ permanent magnets to make any and all of the magnetic components. Preferably, the permanent magnets are comprised of a high magnetic strength alloy such as Neodymium Iron Boron magnets. However, lesser strength permanent magnets known in the art may be used, such as Samarium Cobalt.

Rotor

FIG. 9 shows how, for one specific example, a substantially circular symmetric rotor 310 comprises two diametrically opposed, arcuate sectors, 310a and 310b, respectively. Each arcuate sector is defined by concentric outer and inner arcuate segments, 350aa–b and 350c–d, respectively, uniformly spaced apart, thereby defining an arcuate channel therebetween. The outer and inner segments are comprised of a predetermined amount of permanent magnet members with attracting poles so arranged so as to define a permanently magnetized channel having a substantially radially magnetic field therebetween.

It is an important feature of these examples that the polarity of the permanent magnet field extending across each channel be in radially opposite N-S configurations.

More specifically, for this dual-sector rotor, the channel polarity of 310a is N-S with respect to the rotor's central axis 380 whereas the channel polarity for 310b is S-N. The significance of this alternating channel polarity will become clear when the operation of this model is described below.

Outer permanent magnet segment 350a is bounded by an outer circumferential wall plate, a concentric inner plate wall and radial side plates respectively. The plates are welded together and capped with aluminum bars to hold a predetermined amount of radially aligned permanent magnet members. Inner permanent magnet segment 350b is bounded by an outer circumferential plate wall also defining the inner side of the channel and an inner concentric plate wall and radial side plates respectively welded together and capped to hold a plurality of radially aligned permanent magnet members. All of the arcuate plate walls are substantially concentric and progress from a maximum outer circumferential arc length to a minimum arc length. The inner wall plate for the outer segment and outer wall plate for the inner segment define the outer and inner faceplate for the channel 311.

FIG. 9 shows how each rotor arcuate sector, 310a and 310b, further comprises inner and outer arcuate permanent magnet segments, e.g., sector 310a comprises segments 350a and 350b, concentrically disposed with respect to the rotor's central axis of rotation. The permanent magnet arcuate segments 350a and 350b are uniformly spaced apart by a recess of width h so as to form an arcuate channel therebetween. The arcuate segments 350a and 350b are mounted on separate base plates which allows 350b to be moved radially inward and outward enabling adjustment of channel width h. Adjusting channel width h tunes the magnitude of the magnetic interactions in accordance with the square law for magnetic poles.

In the prototype model, rotor sections 310a and 310b including the adjustable plate (not shown) are further supported by a substantially rectangular plate (not shown) in which the rotor resembles a double-sided pendulum.

The supporting plate is mounted on a rotatable shaft disposed from the rotor's central axis supported by three thrust bearings which are attached to the supporting frame. The rotor shaft is disposed below the level of the supporting plate where a suitable power take-off means is attached thereto by a belt means. Other shaped plates are suitable for supporting rotor annular sectors depending on the number of sectors used for the rotor, such as, for example, substantially circular or polygonal shaped plates.

Construction of Rotor Permanent Magnet Segments 350a–350d

FIG. 4 shows how for the prototype model, permanent magnet arcuate segments 350a–350d are comprised of a plurality of substantially rectangular bar magnets arranged and held together. In one embodiment, five substantially rectangular Neodymium Iron Boron bar magnets are linearly arranged in a group so that their abutting pole faces attract one another (not shown). As known in the art, magnetic poles so arranged have a generally north and south pole for the entire group.

It is an important aspect of these examples that the arcuate magnet segments are comprised of these linear bar magnet groups so arranged with their pole faces aligned against the periphery of the channel faceplates. This is what creates the radially aligned magnetic field across the channel. It is believed that this design produces a superior radial field than that achieved in the prior art with single piece arcuate bar magnets.

FIG. 4 shows how for the prototype model, each outer magnetic arcuate segment comprises a plurality of bar magnet groups. Each group is vertically held in place by aluminum holding fixtures which anchor the arrangements in place. The vertical hold down fixtures are attached to the arcuate faceplates which form a mechanical latch. Similarly, each inner magnetic arcuate segment is made up of a plurality of bar magnet groups, vertically held in place by aluminum holding fixtures mechanically latched to arcuate faceplates.

The holding fixtures have two general purposes. First, they allow the magnets to resist rotational and centripetal forces of motion while the motor is operating. Second, during construction of a rotor segment, the vertical hold down fixtures overcome the lateral repelling forces produced by the fringe magnetic fields of the magnet arrangements as they are placed in side-by-side proximity. In the prototype model, aluminum blocks and screw fasteners and bolts are used together with epoxy to position the powerful Neodymium Iron Boron bar magnets in place. As known in the art, a production model may use a one-piece arcuate permanent magnet manufactured according to specifications substantially equivalent to the arcuate segment made by the aforementioned arrangements.

The faceplates serve to hold the bar magnets in place and form the boundary of arcuate edges.

The concentric, permanent magnet annular sectors have (north/south or +/−) pole faces with polarities as shown in FIG. 4. Magnetic flux lines are shown primarily for the inner channel, although, as known in the art, weak fringe magnetic field lines exist outside and around the magnetic sectors as well.

In operation, the fringe effects of these fields, just as any eddy currents typically induced in secondary conductors such as the aluminum, may be ignored due to symmetry of design and low magnetic permeability of materials used in construction. As with most of the magnetic elements described herein, non-magnetizable 300 series stainless steel may be used to build the rotor because it is magnetically inert, i.e., it is not affected by magnetic fields; it is a relatively poor conductor for secondary eddy currents to be induced upon; and, it is highly permeable to magnetic fields so the fields pass readily through.

Diametrically opposed rotor sectors have their pole faces arranged so that each annular sector has the opposite magnetic polarity across its channel. In the prototype model, this is accomplished simply by stacking the bar magnets as described above with the polarities of the individual bar magnets reversed. The result is two symmetrically configured rotor sectors that are diametrically opposed in position and polarity. FIG. 4 shows how each diametrically opposed rotor sector has a channel with magnetic field lines pointing radially inward and outward respectively, each in the opposite direction. The significance of this design function will become evident when the operation of this permanent magnet embodiment is described.

It should be noted that embodiments may employ multiple rotor sectors, for example, four rotor sectors positioned at 90° increments. In such embodiments, the polarities of the channel for each sector alternate circumferentially. The alternating channel polarity is characteristic of any multi-sectored rotor design where the number of sectors is an even number.

The rotor 310 of the prototype model is supported on/by a nonmagnetic bearing means well known in the art. For every embodiment of the present invention, the rotor is powered by its magnetic interactions with the lower stator. Rotor 310 does not receive any other assist for its rotation. A suitable power take-off means can be attached to the bottom of the rotor shaft which runs through the central axis of the rotor.

Lower Spinning Stator

FIG. 9 shows how, when viewed externally, lower spinning stator 320 resembles a substantially cylindrical canister. The lower stator housing is made from non-magnetizable stainless steel 300 series.

The lower stator has a substantially cylindrical peripheral wall/housing, and substantially circular base and top plates. The top plate has attachment means (collar and set screw arrangement) so that the lower stator can be centrally suspended from rotatable shaft section 344c as shown. In the prototype model, the shaft attaches to the top of the lower spinning stator through spool attachment means and threaded fasteners.

The top and bottom stator plates are secured by any suitable fastening means known in the art. Preferably, screw fasteners are employed but other suitable fastening means, such as fastening means used in the aircraft industry, including nuts and bolts, or alternatively, welding methods of securing, may be employed. When fasteners are used to secure the stator, the stator cylinder housing has the appropriate bosses and threads to accept screws or other equivalent fasteners.

As with the construction of the annular sectors of the rotor, the lower spinning stator is comprised of a plurality of Neodymium Iron Boron permanent magnets. In one embodiment, for example, a total of thirty stator bar magnets are double stacked, three across and five deep, in a 2×3×5 (row×column×depth) attractive alignment with respect to the individual north and south poles faces. The stator bar magnets are initially held in place with temporary means and inserted into the canister. Then the canister is covered with epoxy to fill any voids therein. Once assembled, the lower spinning stator has a magnetic field or lines of magnetic flux as shown in FIG. 4. As is the case of the rectangularly configured magnetic elements, an alternative embodiment may employ a single piece bar magnet having substantially the same magnetic lines of flux as the aforementioned thirty stator bar magnets. If a rectangular stator magnetic element is used, the canister does not have to be cylindrical but may be rectangular in which case the diagonal dimension is less that the width of the channel.

Lower Stator Spinning Means

FIG. 9 illustrates an embodiment of the present invention in which the means for spinning the lower stator comprises an upper spinning stator 342 and linear magnet assembly 343 in combination.

The upper stator is integrally disposed between a pair of upper and lower shaft segments 344b1 and 344b2, which comprise middle section 344b of three piece shaft 344. The construction of the upper stator is substantially the same as that for the lower stator except that both its base and top plates have means for attaching to upper and lower segments 344b and 344b2 of middle shaft 344b.

Linear magnet assembly 343 comprises two permanent magnet rectangular box sections having pole faces as shown in FIG. 9. Each rectangular box is parallely spaced apart so as to form a substantially rectilinear channel therebetween. The channel has magnetic field lines (not shown). The width of the channel is slightly larger than the outer diameter of upper spinning stator 342. As with the assembly of the rotor and stators described, each rectangular section is comprised of a plurality of bar magnets as shown. Grouping the individual bar magnets in this way forms a rectangular array which is supported and held in place by a-stainless steel casing. As before, a larger single piece magnet may be substituted for the individual bars. However, it is important for the operation that the depth of each linear bank be substantially equal to the depth of stator magnet element.

In one embodiment, the linear magnets are permanently disposed in a configuration which encompasses the upper stator as shown in FIG. 9. When the upper stator and middle shaft section are stationary, the upper stator and linear magnets are arranged in a magnetically repulsive mode.

In an alternative embodiment, the linear magnet array 343 may be movably mounted on a dual track means whereby the array can be brought into and out of proximity with the upper stator 342, and therefore into and out of repulsion mode, at intermittent points during a cycle of operation. It is believed that by not maintaining the upper stator and linear magnets in constant repulsion mode in this manner, the magnets have a prolonged lifetime of use. However, the stationary linear magnet array embodiment is preferred because it has the advantage of using less components for its operation, which may make it more suitable for a commercial embodiment.

The thickness of the linear magnet retaining walls are such that the gap between the upper spinning stator and the linear magnets is greater than the gap between the lower spinning stator and the rotor magnets. As will be described below, the differences in gap between the upper spinning stator and the linear magnets can be made adjustable to precisely equalize the magnetic forces of the upper and lower spinning stators.

Shaft

FIG. 9 diagrammatically and generally illustrates how for all of the examples having a flywheel assembly herein described, three piece shaft 344 comprises shaft sections 344a, 344b and 344c. Shaft section 344b is further comprised of subsections 344b1 and 344b2 integrally connected and disposed from the top and bottom housing portions of upper stator 342, respectively. Any rotation of shaft section 344b includes the rotation of its constituent component subsections 344b1 and 344b2.

Shaft sections 344a and 344b are engaged and disengaged with respect to each other through upper coupler assembly 345. Rotation of shaft section 344b and upper stator 342 is stopped through an upper stator stopper assembly. As will be described in further detail, rotation of shaft section 344b, and therefore upper stator 342, is stopped by an upper stator stopper in conjunction with the upper coupler's disengagement of shaft sections 344a and 344b. Shaft section 344b, and therefore upper stator 342, is allowed to rotate when the upper stator stopper is disengaged in conjunction with upper coupler's engagement of shaft sections 344a and 344b.

Shaft sections 344b and 344c, are engaged and disengaged by lower coupler assembly 346. Rotation of shaft section 344c, and therefore lower stator 320, is stopped by the lower stator stopper assembly. As will be described in further detail, shaft section 344c, and therefore lower stator 320 is stopped by a lower stator stopper in conjunction with lower coupler assembly's disengagement of shaft sections 344b and 344c.

As can be seen from the serial connectivity of shaft sections 344a–344b and 344b–344c respectively, shaft section 344c, and therefore, lower spinning stator 320, is allowed to rotate only when shaft section 344b, and, therefore, upper stator 342, rotate.

Therefore, during freewheeling mode, in which both the upper and lower spinning stators are rotated, all three-shaft sections are engaged in unison. This is because the upper and lower stator stoppers are disengaged in conjunction with the upper coupler assembly's engagement of sections 344a and 344b. The lower coupler assembly's engagement of shaft sections 344b and 344c has already occurred.

Detailed Description of Shaft and Associated Components

Shaft section 344a is integrally disposed from flywheel 341a. Flywheel 341a and shaft section 344a are rotatably supported by two nonmagnetic stainless steel bearings. Flywheel 341a can be attached to shaft section 344a by any suitable means known in the art, such as set screws and collar arrangements or welding. Preferably high strength set screws are screwed into the shaft as in the prototype model.

Upper coupler assembly 345 comprises an upper vertical pin assembly and upper vertical pin catcher assembly and is attached at the top of shaft 344b. The bottom of shaft section 344a terminates in the upper vertical pin assembly of upper coupler assembly 345.

The vertical pin assembly further includes a vertical pin housing having a canti-levered end section which is adapted to swivel about an end and a solid section. The canti-levered section contains the housing which holds the vertical pin. The housing has a stop which prevents the pin from flying out. The vertical pin is spring loaded so that when the vertical pin is disengaged it is under compression. The spring acts as an assist when engaging the pin catcher. Vertical pin housing further comprises a nose pin. Lifting the nose pin upward disengages the vertical pin by allowing the vertical pin's taper to slip out of the catcher. Almost instantaneously thereafter, a horizontal tab on the pin housing strikes the release mechanism of the catcher. The vertical pin housing is attached to the lower end of shaft section 344a by means of screw fasteners which thread into the shaft.

The upper stator stopper assembly comprises a housing having a tubular extension adapted to contain a horizontal freezing pin. The horizontal freezing pin has a circular activator threaded into its base and a vertical tip pin to prevent the freezing pin from being pushed in too far. The freezing pin can slide horizontally inward and outward. When a lever cam is activated, a disk makes contact and rides along the cam, sliding the horizontal freezing pin outward. In this extended position, the freezing pin strikes the horizontal pin housing so as to stop the rotation of the stator stopper housing and therefore shaft section 344b. As will be described, shaft section 344a and 344b are disengaged at this point so as not to destroy the device.

In one embodiment, shaft section 344b can not be allowed to stop or remain locked while engaged to shaft section 344a. This necessitates some interdependency in the operation of the upper vertical pin assembly and upper and lower stator stopper assemblies. Thus, as described, prior to engagement of shafts 344a and 344b and their subsequent rotation, the upper stator stopper must release shaft 344b to free it for rotation. This is accomplished by activating a lever which pushes the upper horizontal pin inward.

As a corollary, prior to locking shaft 344b, the upper vertical pin must be released by a horizontal catcher to disengage shaft sections 344a and 344b. This is accomplished by moving the horizontal freezing pin out by the lever as described. When the horizontal freezing pin strikes the horizontal block assembly, the cam lever is raised to a position where it trips a catching pin releaser. The mechanism is fully automatic and nearly simultaneous; the stopping mechanism has some slack and resiliency in it so that some of the impact is absorbed and used to trip the releaser. The stopper housing may be comprised of a spring biased rod. Upon impact the rod is pushed back and up so as to trip the releaser and stop the horizontal licking pin simultaneously.

The upper assembly also resets itself automatically at this point for the next cycle where it will be disengaged. This is accomplished by means of magnets attached on levers. When the horizontal stopper is stopped as shown, the lever is thrown backward from the recoil. When the lever is flipped back to position, it is repelled by magnet. The repelling action magnetically forces the lever back to its original position. Thus, the lever is reset for another cycle.

The lower end of shaft section 344b terminates with a lower dual vertical pin assembly. The lower vertical pin assembly operates in the same manner as the upper vertical pin assembly with the exception that the vertical pins alternate their engagement with the pin catcher every other cycle. As will be described in the next section, this allows the lower stator to rotate an odd number of half revolutions in juxtaposition to the upper stators even number of half revolutions.

The lower vertical pin catcher operates in the same manner as the upper pin catcher except that it catches opposing pins every other cycle. The lower stator stopper has two horizontal freezing pins spaced apart by 180°. As will be described, this enables the lower spinning stator to stop after an odd number of half revolutions with each power cycle as opposed to stopping the upper stator after an even number of half revolutions.

In operation and prior to engagement of shaft sections 344a and 344b, shaft section 344a rotates continuously while shaft section 344*b* is locked. The vertical pin assembly is activated when a spring loaded vertical pin is depressed by a level. At the same time, the upper and lower stator stoppers are disengaged. The depressed vertical pin is thereby lowered to a level where it will engage the pin catcher. The pin catcher then grabs the pin and automatically locks it in place.

When the vertical pin assembly is locked in by the pin catcher, shaft sections 344*a* and 344*b* are mechanically engaged to rotate in unison. When the vertical pin is pushed into its lowered position, it engages the pin catcher and shaft sections 344*a* and 344*b* will rotate as a unit.

Upper Stator Stopper Assembly

In the prototype model, the stator stopper assemblies are triggered or activated by mechanical levers and push rods. However, it will be obvious to those skilled in the art that any suitable activating means, such as cams, electronic activators and solenoid coils can be substituted for the mechanical triggers.

In the prototype model, upper and lower couplers and upper and lower stator stoppers are mechanical assemblies. However, other suitable coupling means for engaging and disengaging the shaft and stopping rotation may be employed such as clutch mechanisms, fluid couplers, and magnetic couplers. Disc brakes and magnetic brakes may alternatively be use to stop rotation.

Operation

In operation, three piece shaft 344 employs mechanical couplers that are activated by mechanical triggers in such a way that sections 344*a*, 344*b*, 344*c* or 344*b*, 344*c* or 344*c* alone, can rotate as a unit shaft.

The first step of operation is to engage all three sections of the shaft and rotate the lower stator into repulsion mode to expel the rotor. The force to rotate the lower stator is provided primarily from the force produced by the upper stator which is locked in repulsion mode. The electric motor 341*b* provides an assist and initial rotation in the set direction clockwise/counterclockwise.

Steady state can be described by considering the lower stator as a point of reference. As rotor 310 approaches the lower stator in attraction mode, i.e., a sector, e.g., 310*a*, approaches the lower stator so that the polarity of its channel 311 is attracted to the opposite polarity of the stator. The attraction force grows stronger as the sector gets closer. As known in the art, the force of attraction between permanent magnets is inversely proportional to the square of the distance between magnetic poles. There is a point in the rotation where the full width of the permanent magnets inside the lower stator is initially engulfed by channel 311 of the rotor 310. At a point of rotor rotation shortly thereafter, the tangential fluxes are nearly fully absorbed. At this point, the timing mechanism engages the upper shaft 344*a* to connect with the intermediate shaft 344*b*.

During the initial part of a cycle, top section 344*a* rotates under the power of the flywheel assembly 341. This continues as the rotor 310 approaches the lower stator 320 in attraction mode as shown in FIG. 6. At this stage of operation, one of the two lower vertical pins is already engaged. For ease of reference, it may be assumed that the lower vertical pin is engaged, and both horizontal freezing pins are engaged as shaft sections 344*b* and 344*c*, and the upper and lower stators are locked in place.

After the rotor channel 311 initially engulfs the lower stator to a point where the stator magnet is nearly completely within the channel, the upper vertical pin is depressed simultaneously with the disengagement of both horizontal freezing pins. Thus all three shaft sections, 344*a*, 344*b* and 344*c* are mechanically engaged to rotate as a unit shaft. It is at this point that the three piece shaft becomes a "neutral shaft", that is, the magnetic force required to rotate the lower stator 320 a half revolution from its attraction mode in the channel 311 is provided by the repulsion force created by the combination of the upper stator 342 and linear magnetic assembly 343. When a half revolution is achieved, the power for the second revolution is provided by the repulsive force between the lower stator and the channel to overcome the magnetic attraction between the upper stator and linear magnet assembly. Thus, shaft rotation is substantially self-sustaining and the lower stator's rotation requires very little energy from the flywheel assembly 341 to continue its rotation. While rotating, the lower stator 320 is in a free-wheeling state. Of course, some energy is drawn from the flywheel assembly to overcome the mechanical frictional forces therein. However, with respect to the magnetic forces there is no magnetic losses from magnetic inefficiency. Moreover, there is no cogging during neutral shaft conditions and freewheeling mode.

The neutral shaft condition and freewheeling mode is maintained by offsetting magnetic drag, i.e., attraction force between a pair of magnetic poles, with magnetic repulsion created by another set of magnetic poles. Thus, this condition can only be maintained while the rotor is within the channel plus or minus a few rotor degrees of rotation.

The timing can be adjusted so that the simultaneous spinning of the upper and lower stators, i.e., the neutral shaft and freewheeling mode, can be stopped at any time. However, it is preferable to stop this mode at some point after the halfway point before the trailing edge of the rotor.

The neutral shaft condition and freewheeling rotation continues, as illustrated in FIG. 7, until the lower stator 320 has reached at least the halfway locus point through the channel 311. At approximately this point and only after the lower stator has rotated an odd number of half revolutions, the lower stator is frozen into repulsion mode, a 180° out of phase with its initial attraction mode starting point. This is accomplished by disengaging shaft sections 344*b* and 344*c* and stopping shaft 344*c* with the aid of the lower stator stopper. As with the upper assembly, a cam is engaged radial outward and a horizontal disk rides on the cam pushing the horizontal freezing pin outward. The horizontal freezing pin thereby contacts the push rod.

When the horizontal freezing pin strikes the horizontal block assembly, the cam lever is raised so that it trips the catching pin releaser. The mechanism is fully automatic and nearly simultaneous; the stopping mechanism has some slack and resiliency in it so that some of the impact is absorbed and use to trip the releaser. The stopper housing is a spring-biased rod. Upon impact the rod is pushed back and up so as to trip the releaser and stop the horizontal locking pin simultaneously.

When the rotor 310 has engulfed the lower stator 320 so that the stator is approximately half a diameter in, the lower two sections of the shaft are simultaneously engaged and all three pieces rotate in unison.

During the period in which the three sections are engaged in rotation, both the upper and lower stators 342 and 320, respectively spin in unison with the shaft and a minimum of power is extracted from the flywheel assembly. The primary power for shaft rotation is supplied from the magnetic interactions of the upper and lower spinning stators. The upper and lower stators are always in opposing phases with respect to their magnetic lines of force. That is, while the lower stator 320 approaches attraction mode with respect to the moving rotor channel 311, the upper stator 342 approaches repulsion mode with respect to the static linear magnet assembly 343, and vice versa. Thus a dynamic situation exists where the power for shaft rotation is primarily supplied by the upper and lower stators in combination.

The concept of the neutral shaft can be dramatically illustrated with the following operation conducted on the prototype model. With the flywheel assembly means 341 powered off and the rotor 310 in a position of maximum static attraction with respect to the lower stator, the lower stator 320 and rotor 310 are in the midway point as illustrated in FIG. 6. The linear magnet assembly 343 is removed from the proximity of the upper stator 342 and the shaft 344 is maintained so that all three sections are engaged as a unit. (The couplers 345 and 346 are engaged so that both stators rotate with the shaft.) The operation continues as follows: the flywheel 341a is attempted to be rotated by hand by grabbing the flywheel for leverage. As the flywheel and both upper and lower stators have been engaged, rotation of the flywheel will rotate the three piece shaft and hence the stators as well. However, since the lower stator is in a static attraction mode with the rotor 310, there will be added resistance to rotation of the components. Essentially the force to be overcome is the force of magnetic attraction between the lower stator and the rotor channel 311 as shown in FIG. 7. As these magnetic elements are made out of Neodymium Iron Boron, their strength is considerable and it is virtually impossible to manually rotate the device in this position. At this point, the linear magnet assembly 343 is brought into proximity with the upper stator 342 so that it is in a static repulsion mode with respect to the upper stator as shown in FIG. 9. Now, once again, the flywheel is attempted to be rotated. The magnetic force of attraction between the lower stator 320 and rotor channel 311 are canceled out by the magnetic force of repulsion between the upper stator 342 and linear magnets 343. The shaft can be rotated with relatively minor force to the flywheel. This condition where rotation of the shaft requires application of a minimum of energy is referred to herein as the neutral shaft. As a result, in the dynamic operation of the device, the lower stator 320 spins notwithstanding the presence of the magnetic field within the rotor channel 311 and without consuming much energy from the flywheel assembly. The lower stator is said to be in a freewheeling mode and the shaft is said to be a neutral shaft, i.e., rotation can be maintained without energy losses attributable to magnetic drag. Furthermore, "cogging" is either reduced or eliminated. The lower and upper stators continue to spin in unison and the shaft 344 remains neutral while the lower stator 320 spins in freewheeling mode. When the channel 311 has moved to an optimal position for the lower stator to lock into repulsion mode, the lower shaft 344c is disengaged and locked by clutch 346, thereby stopping the lower stator's rotation so that it is in a repulsion mode with respect to the channel. See FIG. 8. Thus, the lower stator has switched from a static mode of attraction to a dynamic freewheeling mode to a static mode of repulsion, and is accomplished with minimal energy loss.

At this point, the rotor is at least halfway in or symmetrically in the middle of the channel, the bottom shaft 344c is disengaged and locked while the upper two sections 344a and 344b continue to rotate in unison. During the spinning of the lower stator the number of revolutions must be an integral number plus an added half revolution so that the lower stator is locked in repulsion mode. Thus, the lower stator revolves (n+½) revolutions or (n×360)+180° where n is an integer greater than zero. The upper two sections of the shaft continue to rotate for an integral number of revolutions k, where k is an integer greater than n. Typically, k is about 10 revolutions. Thus, the upper stator rotates for a brief period beyond that of the lower stator. However, the upper stator revolves a full number of revolutions or an integer multiple of 360 (k revolutions where k is an integer greater than n). Thereafter, the middle section of the shaft 344b is disengaged and locked in repulsion mode once again while the top section 344a remains rotating with the flywheel assembly 341. Notably, the lower stator 320 has switched its static magnetic mode with respect to the channel from attraction to repulsion. The upper stator has enough rotational momentum so that when the lower stator locks up in repulsion mode the upper stator still has enough momentum to return to its repulsion mode. The upper stator 342 resumes its original static repulsion mode with respect to the linear magnets 343.

At the appropriate point in time when the channel segment of the rotor has almost completely taken in the stator, the three piece shaft locks in as one unit shaft again.

This mechanical combination of cascading disconnections then repeats. The timing is such that the majority of the unit rotation takes place when the stator is about to be enveloped by the channel of the rotor.

Only one power pulse, or cycle, has been described. In the embodiments having two neutral shafts diametrically opposed, there are two power pulses occurring simultaneously, on opposite sides and in each channel. It is possible to have a four-channeled rotor and a twin-shafted set of stators. In this case, two power pulses occur simultaneously and four pulses occur for every revolution of the rotor.

Both the upper and lower stators continue to spin as the channel swings by in its trajectory. The upper and lower stators have their respective attraction and repulsion sites in opposition so that, for example, when the upper stator is repulsed by the linear magnets, at the same time, the lower stator is attracted to the channel. And when the upper stator is attracted to the linear magnets, the lower stator is repulsed by the channel. This is a key feature of this invention, to time magnetic repulsions with magnetic attractions precisely so that very little energy is extracted for rotating the shaft. Hence, the shaft is said to be in a neutral state or a neutral shaft because the force to turn the lower stator 180° is provided for by the repulsion of the upper stator; and the force to turn the upper stator and continue rotation another 180° is provided by the repulsion of the lower stator in the channel, and this process repeats. During this process the lower stator is said to be in freewheeling mode because it appears to rotate freely without the need for shielding the localized attractive forces. Thus, the lower stator rotates without cogging and without incurring magnetic drag well known in the prior art. Also, while the lower stator is rotating in freewheeling mode, there appears to be no effect upon the rotor's rotational momentum.

What is claimed is:

1. A system that converts electric power to rotary force, comprising:

an electric motor having a shaft;

a flywheel assembly comprising a flywheel coupled to the shaft to rotate the flywheel when the electric motor is rotating the shaft;

a stator comprising an upper stator, a lower stator, and a stator shaft coupling the upper and lower stators and the flywheel to rotate the stator, the upper and lower stators each comprising an arrangement of magnets that generates generally radially opposing external magnetic fields with respect to each other;

a magnetic assembly in proximity of the upper stator to assist in rotating the upper stator through application of magnetic forces upon the upper stator;

a rotor comprising a power take off shaft and an arrangement of magnets that forms an arcuate channel through which the lower stator passes to assist in rotating the rotor through application of magnetic forces upon the rotor, the rotor divided into a pair of sectors that generate generally radially opposing magnetic fields across the arcuate channel in alternating sectors, the lower stator spinning and stopping as appropriate to rotate the rotor by alternately pulling the rotor via application of attractive magnetic forces upon the rotor as the stator enters one of the pair of sectors, and push the rotor with application of repulsive magnetic forces upon the rotor as the stator exits the one of the pair of sectors.

2. In a system that converts electric power to rotary force, a method comprising:

a) disengaging a flywheel from a shaft of an electric motor to prevent rotation thereof;

b) disengageably coupling an upper stator to a lower stator via a stator shaft, the upper and lower stators each comprising an arrangement of magnets that generates generally radially opposing external magnetic fields with respect to each other;

c) moving a magnetic assembly away from the upper stator to prevent rotation of the upper stator through application of opposing external magnetic forces generated by the magnetic assembly upon the upper stator;

d) inserting the lower stator within an arcuate channel of one of a pair of sectors of a rotor such that the sector is magnetically attracted to the lower stator, the pair of sectors each comprising an arrangement of magnets that generate a generally radially opposing external magnetic field across the arcuate channel with respect to each other;

e) moving the magnetic assembly within proximity of the upper stator such that the upper stator is magnetically repelled by the magnetic assembly;

f) coupling the upper stator to the flywheel and engaging the flywheel to the shaft of the electric motor to rotate the flywheel, upper and lower stator;

g) disengaging the lower stator from the upper stator and locking the lower stator to magnetically repel the sector of the rotor within which it is inserted, and attract the next sector toward the lower stator;

h) disengaging the flywheel from the upper stator, i) locking the upper stator so that the upper stator magnetically repels the magnetic assembly;

j) disengageably coupling the upper and lower stators; and k) repeating f) through j) to provide continued rotation of the rotor.

* * * * *